United States Patent
Cerea

(10) Patent No.: US 7,204,928 B2
(45) Date of Patent: Apr. 17, 2007

(54) PROCESS AND APPARATUS FOR THE FRACTIONAL DISTILLATION OF CRUDE OIL

(75) Inventor: Giuseppina Cerea, Milan (IT)

(73) Assignee: Vomm Chemipharma S.r.l., Milan (IT)

( * ) Notice: Subject to any disclaimer, the term of this patent is extended or adjusted under 35 U.S.C. 154(b) by 457 days.

(21) Appl. No.: 10/381,579

(22) PCT Filed: Sep. 24, 2001

(86) PCT No.: PCT/EP01/11016

§ 371 (c)(1),
(2), (4) Date: Jul. 15, 2003

(87) PCT Pub. No.: WO02/26915

PCT Pub. Date: Apr. 4, 2002

(65) Prior Publication Data

US 2004/0011707 A1 Jan. 22, 2004

(30) Foreign Application Priority Data

Sep. 27, 2000 (IT) .......................... MI2000A2095

(51) Int. Cl.
*C10G 7/00* (2006.01)
(52) U.S. Cl. .................. 208/347; 208/355; 196/46; 196/112; 196/123; 34/315; 34/321; 405/128.8; 528/483
(58) Field of Classification Search .................. 34/315, 34/321; 195/123; 196/46, 112, 123; 208/347, 208/355; 405/128.8; 528/483
See application file for complete search history.

(56) References Cited

U.S. PATENT DOCUMENTS

| | | | |
|---|---|---|---|
| 1,944,877 A | 1/1934 | Darlington | |
| 3,310,487 A * | 3/1967 | Johnson et al. | 208/355 |
| 5,962,763 A | 10/1999 | Cossee et al. | |
| 6,048,960 A * | 4/2000 | Cerea | 528/483 |
| 6,551,026 B2 * | 4/2003 | Cerea | 405/128.8 |
| 6,757,987 B2 * | 7/2004 | Cerea | 34/321 |

FOREIGN PATENT DOCUMENTS

| | | |
|---|---|---|
| EP | 0 728 728 A1 | 8/1996 |
| FR | 2 277 611 | 2/1976 |
| RU | 2 065 472 C1 | 8/1996 |

\* cited by examiner

*Primary Examiner*—Glenn Caldarola
*Assistant Examiner*—Prem C. Singh
(74) *Attorney, Agent, or Firm*—Akerman Senterfitt

(57) ABSTRACT

A process for the fractional distillation of crude oil, which comprises the steps of: feeding a continuous current of crude oil at 310–400° C. into a turbomixer comprising a tubular cylindrical body (1) provided with a rotor (9) formed with helically oriented paddles (10) and rotatably supported inside the body, along with a continuous current of steam; subjecting both currents to the mechanical action of the paddled rotor (9), so as to create a thin tubular dynamic turbulent layer, which is discharged and fed continuously into a fractioning column, at a predetermined height level in the column, to produce an upward-flowing vapor current and a downward-flowing liquid current therein; and optionally discharging the downward-flowing liquid current continuously from the column bottom, and feeding it continuously into the turbomixer in the same direction as the crude oil current.

5 Claims, 1 Drawing Sheet

PROCESS AND APPARATUS FOR THE FRACTIONAL DISTILLATION OF CRUDE OIL

FIELD OF APPLICATION

Figure 1:
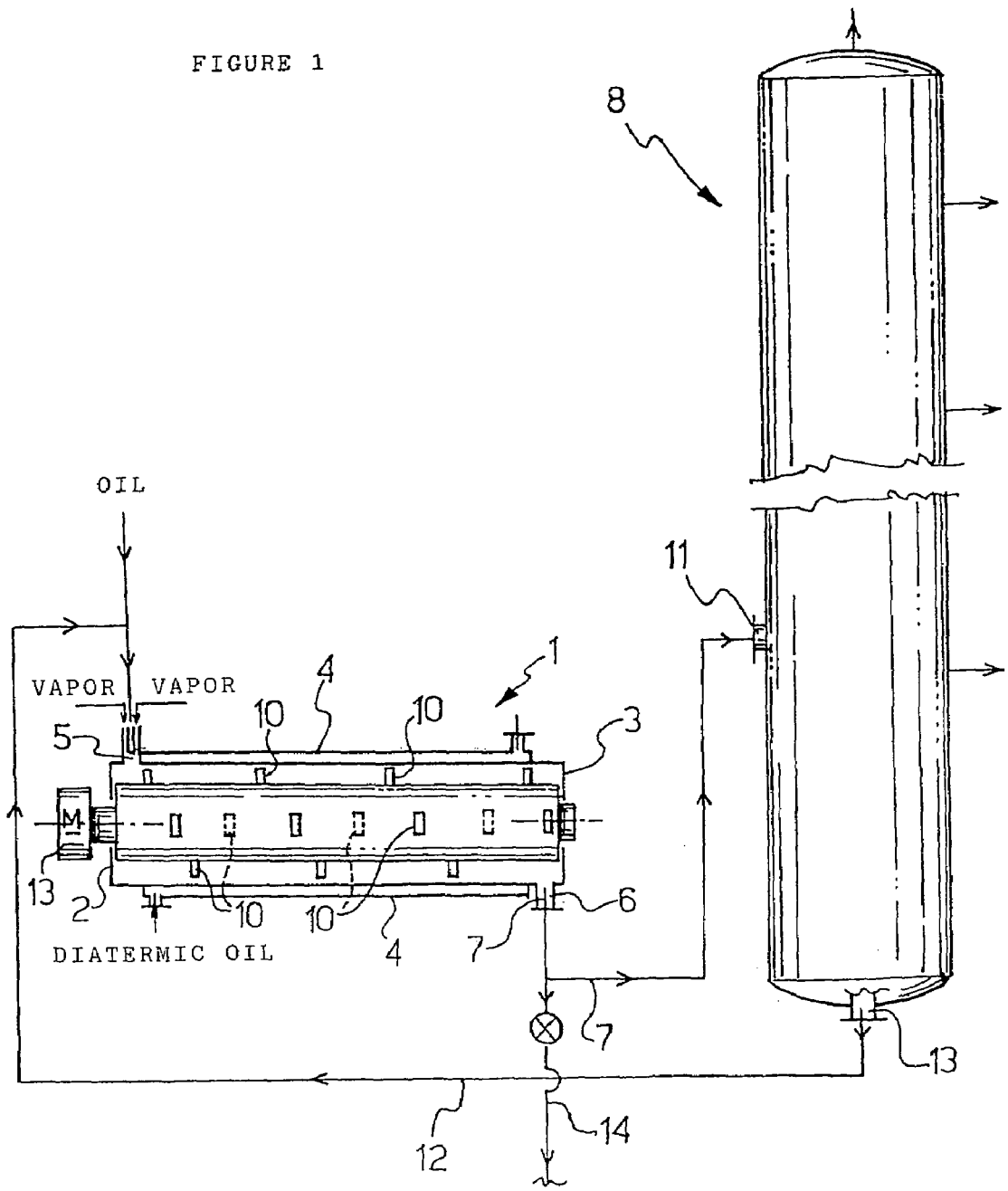

The field of this invention is the petrochemical industry.

In particular, the invention relates to a process and an apparatus for fractionating crude oil.

PRIOR ART

It is well known that to obtain suitable products for use as fuels, raw materials in the chemical industry, lubricants, etc., from crude oil, a number of processing steps are to be carried out, starting of necessity with the fractional distillation of the crude oil. This may be followed by other processes, among which reforming and cracking, for further purifying the products delivered from the fractionating process, improving their quality, or modifying them.

The fractional distillation of crude oil is carried out, in large fractionating columns provided with perforated or bell-shaped trays, by feeding the crude oil, as preliminarily desalted and heated in a furnace to a temperature of 310° to 400° C., onto a tray located at an intermediate height level in the column. At that temperature, the crude oil is a mixture of vapor and liquid. The vaporized low-boiling components flow up through the overlying trays in the column, while the high-boiling components flow down through the underlying trays to the column bottom.

Since skilled persons in the art are surely familiar with the operation of a fractionating column as a whole, heed will be taken of what goes on at the column bottom.

Steam is conventionally injected at the column bottom in order to strip the current of liquid that flows down to the column bottom of any volatile components trapped therein, and improve the output in low-boiling components of the fractionating process.

As the fractionating process proceeds, the liquid collected at the column bottom becomes progressively more dense and viscous, turning eventually into a tar-like residue. For this reason, the process must be stopped periodically to allow the column bottom to be cleared of the deposits and cleaned.

Of course, stopping the refining process affects the plant throughput adversely.

Also, a significant amount of valuable low-boiling components remain trapped in the viscous residue, it being impossible to strip them from the residue by ordinary steam injection.

The underlying problem of this invention is to provide a process and an apparatus that can overcome the aforementioned drawbacks of prior oil refining processes.

SUMMARY OF THE INVENTION

The idea that led to the solution of the above problem was that of placing the crude oil to be fractionated in the most intimate contact possible with the stripping steam, in order to increase the yield in lightweight components and to reduce to a minimum the periodic stops for removing the residue from the column bottom.

Thus, the technical problem has been solved by a process comprising the steps of:

providing a turbomixer, which comprises a cylindrical tubular body provided with a heating jacket, at least one inlet opening, at least one outlet opening, and a rotor formed with helically oriented paddles and rotatably supported inside said body;

feeding a continuous current of crude oil, as preliminarily desalted and heated to 310–400° C., into said turbomixer, with the turbomixer wall being heated to the same temperature as the inflow current of crude oil;

supplying a steam current continuously in the same direction as said crude oil current;

subjecting both said currents to the mechanical action of said paddle rotor, as driven for a peripheral velocity of at least 15 m/s, so as to intimately blend both currents together, centrifuging the blended currents against said heated wall to create a dynamic thin tubular layer in turbulent motion thereon, and conveying said blended currents to said at least one outlet opening; and continuously discharging said blended currents and feeding them into a fractionating column, at a predetermined height level in the column, to produce an upward-flowing vapor current and a downward-flowing liquid current therein.

Advantageously, the downward-flowing liquid current is discharged continuously from the column bottom, and then fed continuously into the turbomixer in the same direction as the crude oil current.

The paddled rotor velocity is preferably of 15 to 40 m/s.

In an alternative embodiment of this invention, the turbomixer may be used to only blend together the steam and the downward-flowing liquid from the bottom of the fractionating column, and the crude oil may be fed directly into the fractionating column.

In this case, the method of this invention would comprise the steps of:

providing a turbomixer, which comprises a tubular cylindrical body provided with a heating jacket, at least one inlet opening, and at least one outlet opening, and comprises a rotor formed with helically oriented paddles and rotatably supported inside said body;

providing a fractional distillation column;

feeding a continuous current of crude oil, as preliminarily desalted and heated to 310–400° C., into said fractionating column, at a predetermined height level in the column, to produce an upward-flowing vapor current and a downward-flowing liquid current therein.

continuously discharging said downward-flowing liquid current from the bottom of said column and feeding it continuously into said turbomixer in the same direction as a continuous steam current, with the wall of said turbomixer being heated to 310–400° C.;

subjecting both said currents to the mechanical action of said paddled rotor, as driven for a peripheral velocity of at least 15 m/s, so as to blend both currents together, centrifuging the blended currents against said heated wall to create a thin dynamic tubular layer in turbulent motion thereon, and conveying said blended currents to said at least one outlet opening; and continuously discharging said blended currents, and continuously feeding them into said fractionating column at said predetermined height level thereof.

It has been found experimentally that, by having the crude oil and steam intimately blended together within the turbomixer, a more effective distillation can be obtained, and this at a lower operating temperature. The lower temperature additionally minimizes any undesired cracking reactions.

By having the oil and steam instantly intimately contacted within the blend, a faster and more effective separation of the volatile components is promoted, and the amount of recycling required for proper fractionating is reduced.

Also, recycling the liquid phase collected from the column bottom allows those low-boiling components that, in conventional fractionating processes, remain trapped in the residue on the column bottom to be released in the utmost proportion.

An important advantage of the inventive process is that it can avoid, or at least minimize, the formation of dense viscous residue on the column bottom by virtue of the liquid on the column bottom being cycled continuously back into the turbomixer.

The last-mentioned apparatus is made very nearly self-cleaning by the powerful mechanical action of the rotor paddles, which graze the inner wall surface of the cylindrical body in the turbomixer, constantly wiping it clean.

In this way, the need to have the column bottom cleaned periodically is eliminated, or at least greatly reduced, which, as said before, considerably depressed the refining plant throughput.

Additional advantages of the process of this invention will be apparent from the following description of an embodiment thereof, given here below by way of non-limitative example with reference to the accompanying drawing, which shows schematically an apparatus for carrying out this process.

With reference to the drawing, an apparatus used for carrying out the inventive process is of a type known as "turbomixer" (e.g. as supplied by VOMM Impianti e Processi, of Rozzano, MI, Italy). It comprises basically a tubular cylindrical body 1 that is closed at either ends by end walls 2, 3 and provided with a coaxial heating jacket through which a fluid, e.g. a diathermic oil, is circulated.

The tubular body 1 has an inlet opening 5 for admitting crude oil and steam thereinto, and has an outlet opening 6 used for delivering the oil/steam blend, this outlet opening being communicated to a fractionating column 8 by a conduit 7.

A paddled rotor 9 is rotatably supported inside the tubular body 1. The paddles 10 of this rotor are helically arranged and oriented to centrifuge the process currents and concurrently convey them to the outlet. A motor 13 drives the rotor 9 at a peripheral velocity in the range of 15 to 40 m/s, preferably of 20 to 30 m/s.

In actual practice, the turbomixer could be formed with more than one inlet openings, contingent on individual requirements.

The column 8 is more markedly schematized in the drawing because conventional. This column is in communication, as said before, with the turbomixer 1 over the conduit 7, which conduit extends from the outlet opening 6 of the turbomixer to an opening 11 provided at a predetermined height level in the column 8. The column 8 is also communicated to the turbomixer 1 by a conduit 12 that extends from an opening 13 in the column bottom to the inlet opening 5 of the turbomixer 1.

The process of this invention is conducted on this apparatus in the manner described here below.

A current of crude oil, as preliminarily desalted and heated to about 310–400° C. through a furnace, is fed continuously into the turbomixer 1 through the inlet opening 5. The turbomixer 1 is also fed continuously a steam current, concurrently with and in the same direction as the oil current, again through the inlet opening 5. The liquid and vapor phases that comprise the heated oil current are both centrifuged by the blades 10 of the rotor 9 against the heated inner wall of the turbomixer, directly as it enters the turbomixer along with the concurrent steam infeed. The helical orientation of the blades 10 of the rotor 9 is also effective to convey the oil/steam blended current to the discharge opening 6.

Throughout their flowpath in the turbomixer 1, the blended current is in the form of a thin tubular dynamic layer in turbulent motion across the inner wall of the turbomixer toward the discharge opening 6.

In this situation, a deep exchange of matter and energy occurs between the crude oil and the steam, and a "pre-distillation" of sort takes place, whereby the low-boiling components begin to separate and, most importantly, a blend of liquid and vapor phases is formed that can be distilled on conventional fractionating columns under less harsh conditions than are conventional.

This blend of the crude oil and steam currents flowing out of the turbomixer through the opening 6, after a residence time of 15 to 60 seconds inside the turbomixer, is taken over the conduit 7 to the fractionating column 8, whereinto it is fed at a predetermined height level in the column through the opening 11.

At this stage, known energy exchange phenomena occur at the various trays in the column, with repeated vaporizing and condensing steps being carried out that lead to the components becoming fractionated. The most volatile components are condensed upon reaching the column head, and in part re-sent into the column as a reflux, as is customary in crude oil fractionating operations. The interesting fractions (gasoline, Diesel oil, kerosene, etc.) can be withdrawn in the same way at different height levels from the column.

On the other hand, the high-boiling liquid components flow down to and collect at the bottom of the column, whence they are discharged through the opening 13 and fed back into the turbomixer over the conduit 12, along with the crude oil.

In this way, the dense viscous residue that typically forms on the bottom of conventionally operated fractionating columns and tends to include valuable low-boiling components no more releasable by mere stripping with steam injected at the column bottom, thereby pulling down the process throughput, is avoided.

Within the turbomixer, the density of the liquid being processed with steam increases progressively and raises the loading on the drive motor of the paddled rotor. Upon the motor amperage reaching a predetermined threshold value, the material contained in the turbomixer is discharged and optionally conveyed to a vacuum fractionating column, also equipped with a respective turbomixer, over a special conduit 14.

By virtue of the intimate contact established between the steam and the organic components inside the thin tubular turbulent layer on the turbomixer interior—organic components from both oil newly fed into the apparatus and the recycled current from the bottom of the fractionating column—the low-boiling components are effectively released at once, even after the recycled current from the column bottom has become highly dense and viscous.

The process of this invention is further illustrated by making reference to an example of a crude oil fractional distillation carried out on a conventional fractionating column operated under atmospheric pressure. The process of this invention could, however, be carried out under a vacuum, by using fractionating columns designed for low-pressure operation and adjusting the experimental parameters in ways well known to the persons skilled in the art.

EXAMPLE

Using the apparatus summarized hereinabove in the process of this invention, crude oil from a preheating furnace at 350° C. was fed continuously into turbomixer 1 at the rate of 1000 l/h, concurrently with and in the same direction as a steam current.

The wall temperature was maintained at about 350° C., and the rotational velocity of the paddled rotor 9 constant at 30 m/s.

After an average 50 seconds of residence in the turbomixer, a current of steam, and vapor and liquid oil components, was continuously discharged and continuously fed into a fractionating column 8 under atmospheric pressure, at the level of an intermediate tray in the column.

Once a condition of equilibrium was attained for distillation, the usual fractions (gasoline, Diesel oil, kerosene, etc.) were withdrawn continuously at given levels, at the same time as the reflux rate was adjusted in conformity with ASTM Method D 2892. This Method provides for 14 to 17 theoretical trays in the column and a reflux ratio of 5. At steady state, a liquid current was discharged continuously from the column bottom and continuously returned to the turbomixer over conduit 12, at the same time as the rate of the fresh crude oil inflow to the turbomixer was reduced. Thus, the overall flow rate was kept at 1000 l/h for both currents.

After 4 weeks of continuous operation, the process was halted to inspect the turbomixer conditions. The turbomixer was found completely free of any viscous tarry residue.

The process throughput showed to be improved as far as valuable lighweight components were concerned, and the high-boiling (above 310° C.) components were found of uncommon good quality.

The invention claimed is:

1. A process for the fractional distillation of crude oil, which comprises the steps of:
   a) providing a turbomixer comprising a tubular cylindrical body provided with a heating jacket, at least one inlet opening, and at least one outlet opening, and comprising a rotor provided with helically oriented paddles and rotatably supported inside said body;
   b) feeding a continuous current of crude oil, as preliminarily desalted and heated to 310–400° C., into said turbomixer, with the turbomixer wall being heated to the same temperature as the inflow current of crude oil;
   c) supplying a steam current continuously in the same direction as said crude oil current;
   d) subjecting both said currents to the mechanical action of said paddled rotor, as driven for a peripheral velocity of at least 15 m/s, so as to intimately blend both currents together, centrifuging the blended currents against said heated wall to create a dynamic thin tubular layer in turbulent motion thereon, and conveying the blended currents to said at least one outlet opening;
   e) continuously discharging said blended currents and feeding them into a fractionating column, at a predetermined height level in the column, to produce an upward-flowing vapor current and a downward-flowing liquid current therein; and
   f) continuously discharging said downward-flowing liquid current from the bottom of said column and continuously feeding it into said turbomixer in the same direction as said crude oil current.

2. The process according to claim 1, wherein the rotational velocity of said paddled rotor is from about 15 m/s to about 40 m/s.

3. A process for the fractional distillation of crude oil, which comprises the steps of:
   a) providing a turbomixer comprising a tubular cylindrical body provided with a heating jacket, at least one inlet opening, and at least one outlet opening, and comprising a rotor formed with helically oriented paddles and rotatably supported inside said body;
   b) providing a fractional distillation column;
   c) feeding a continuous current of crude oil, as preliminarily desalted and heated to 310–400° C., into said fractionating column, at a predetermined height level in the column, to produce an upward-flowing vapor current and a downward-flowing liquid current therein;
   d) continuously discharging said downward-flowing liquid current from the bottom of said column and feeding it continuously into said turbomixer in the same direction as a continuous steam current, with the wall of said turbomixer being heated to 310–400° C.;
   e) subjecting both said currents to the mechanical action of said paddled rotor, as driven for a peripheral velocity of at least 15 m/s, so as to intimately blend both currents together, centrifuging said blended currents against said heated wall to create a thin dynamic tubular layer in turbulent motion thereon, and conveying the blended currents to said at least one outlet opening; and
   f) continuously discharging said blended currents, and continuously feeding them into said fractionating column at said predetermined height level.

4. The process according to claim 3, wherein the rotational velocity of said paddled rotor is from about 15 m/s to about 40 m/s.

5. An apparatus for the fractional distillation of crude oil, comprising at least one rectification column, wherein said at least one column is in fluid communication with a turbomixer comprising a tubular cylindrical body provided with a heating jacket, at least one inlet opening, and at least one outlet opening, and comprising a rotor formed with helically oriented paddles and rotatably supported inside said body, said at least one inlet opening of said turbomixer being communicated over a conduit to an opening provided at a predetermined height level in said column and said at least one inlet opening of said turbomixer being communicated over a conduit to an opening provided in the bottom of said column.

* * * * *